(12) United States Patent
Cepuran et al.

(10) Patent No.: US 8,417,212 B2
(45) Date of Patent: Apr. 9, 2013

(54) METHODS FOR PROVIDING EMERGENCY SERVICES TO A MOBILE VEHICLE

(75) Inventors: Lawrence D. Cepuran, Northville, MI (US); Matthew G. Przybylski, Grand Blanc, MI (US); David A. Holt, Rochester Hills, MI (US)

(73) Assignee: General Motors LLC, Detroit, MI (US)

( * ) Notice: Subject to any disclaimer, the term of this patent is extended or adjusted under 35 U.S.C. 154(b) by 403 days.

(21) Appl. No.: 12/782,669

(22) Filed: May 18, 2010

(65) Prior Publication Data

US 2011/0287733 A1 Nov. 24, 2011

(51) Int. Cl.
*H04M 11/04* (2006.01)

(52) U.S. Cl.
USPC ............... 455/404.1; 455/434; 455/432.1; 455/569.2; 455/445; 455/510

(58) Field of Classification Search ............ 455/434, 455/404.1, 404.2, 456.1, 417, 445, 569.1, 455/569.2, 575.9, 432.1; 379/45
See application file for complete search history.

(56) References Cited

U.S. PATENT DOCUMENTS

| | | | | |
|---|---|---|---|---|
| 6,405,033 B1 * | 6/2002 | Kennedy et al. | ............ | 455/414.1 |
| 6,633,754 B1 * | 10/2003 | Raith | ............ | 455/404.1 |
| 6,819,929 B2 | 11/2004 | Antonucci et al. | | |
| 7,171,226 B2 * | 1/2007 | Crocker et al. | ............ | 455/510 |
| 7,174,153 B2 * | 2/2007 | Ehlers | ............ | 455/404.2 |
| 7,904,060 B2 * | 3/2011 | Krause | ............ | 455/414.1 |
| 7,991,381 B1 * | 8/2011 | Dunne et al. | ............ | 455/404.1 |
| 7,991,407 B2 * | 8/2011 | McCormick et al. | ...... | 455/456.3 |
| 8,116,723 B2 * | 2/2012 | Kaltsukis | ............ | 455/404.2 |
| 8,180,316 B2 * | 5/2012 | Hwang | ............ | 455/404.1 |
| 2003/0109245 A1 | 6/2003 | McCalmont et al. | | |
| 2004/0203569 A1 | 10/2004 | Jijina et al. | | |
| 2005/0164673 A1 * | 7/2005 | Ehlers | ............ | 455/404.1 |
| 2007/0135088 A1 * | 6/2007 | Alessandro | ............ | 455/404.1 |
| 2009/0161836 A1 | 6/2009 | Oesterling | | |
| 2009/0186596 A1 * | 7/2009 | Kaltsukis | ............ | 455/404.2 |
| 2009/0253403 A1 * | 10/2009 | Edge et al. | ............ | 455/404.2 |
| 2010/0273446 A1 * | 10/2010 | Stahlin et al. | ............ | 455/404.2 |
| 2011/0124311 A1 * | 5/2011 | Stahlin | ............ | 455/404.2 |

FOREIGN PATENT DOCUMENTS

| | | |
|---|---|---|
| JP | 2005182281 | 7/2005 |
| KR | 20080012612 | 2/2008 |
| KR | 20080104206 | 12/2008 |

OTHER PUBLICATIONS

International Search Report and Written Opinion for PCT/US2011/035892 dated Feb. 9, 2012 (8 pages).

* cited by examiner

*Primary Examiner* — Sharad Rampuria
(74) *Attorney, Agent, or Firm* — Dierker & Associates, P.C.

(57) ABSTRACT

Methods for providing emergency service to a mobile vehicle are disclosed herein. One method involves monitoring a network country code broadcast from a communications network provider and comparing the network country code with a list of country codes stored in the telematics unit. This method further includes determining where to direct an emergency call by the telematics unit based on the comparing. Another method involves notifying a telematics service provider of a need for emergency services and, in response to a denial for the services, monitoring the network country code broadcast and comparing the network country code with the list of country codes to determine where to direct the emergency call. Yet another method involves notifying a telematics service provider of a need for emergency services and, in response to a denial for the services, automatically notifying another service provider of the same.

19 Claims, 3 Drawing Sheets

US 8,417,212 B2

METHODS FOR PROVIDING EMERGENCY SERVICES TO A MOBILE VEHICLE

TECHNICAL FIELD

The present disclosure relates generally to methods for providing emergency services to a mobile vehicle.

BACKGROUND

Vehicles equipped with telematics systems or other similar hardware are often configured to receive services (such as, e.g., emergency services) from one or more service providers. The services are typically available to such a vehicle so long as the vehicle is i) party to a subscription contract/agreement with the service provider, where the contract/agreement enables the vehicle to receive one or more defined services, and ii) then-currently located within a predefined geographic service area of the service provider.

SUMMARY

Methods for providing emergency services to a mobile vehicle are disclosed herein. One of these methods involves monitoring, via a telematics unit operative disposed in the mobile vehicle, a network country code broadcast from a communications network provider, and comparing, via a processor associated with the telematics unit, the network country code with a first list of country codes stored in an electronic memory of the telematics unit. The first list is associated with a telematics service provider. From the comparing, the method further involves determining where to direct an emergency call made by the telematics unit.

Another method for providing emergency services to a mobile vehicle involves automatically notifying a telematics services provider of a need for emergency services and receiving a denial for the emergency services. The method further involves monitoring, via the telematics unit, a network country code broadcast from a communications network provider, and comparing, via the processor associated with the telematics unit, the network country code with a list of country codes stored in the electronic memory of the telematics unit. The list is associated with a service provider other than the telematics service provider. When the network country code is found in the list, the method further involves directing the telematics unit, via the processor, to automatically place an emergency call with the service provider other than the telematics service provider.

Yet another method for providing emergency services to a mobile vehicle involves automatically notifying a telematics services provider of a need for emergency services and receiving a denial for emergency services. The method further involves directing, via the processor associated with the telematics unit, the telematics unit to place an emergency call with the service provider other than the telematics service provider.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
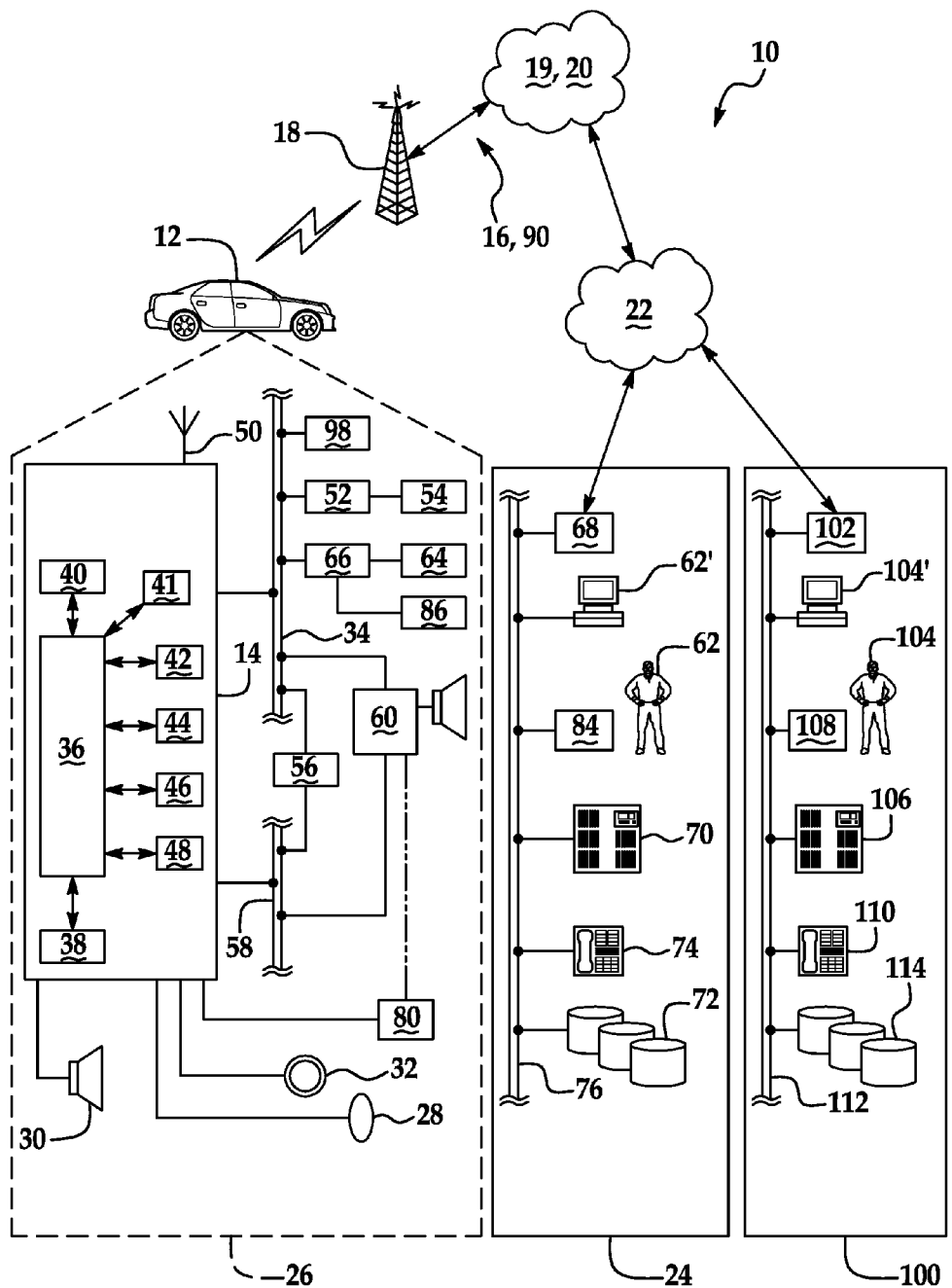
FIG. 1 is a schematic diagram depicting an example of a system for providing emergency services to a mobile vehicle.

Governing authorities of some regions across the globe (such as, e.g., countries within the European Union) have instituted, or have plans to institute various rules, regulations, and/or laws requiring emergency calls to be placed, either manually or automatically, in response to a vehicular incident. Manual emergency calls may be accomplished by a vehicle operator, passenger, or other person(s), for example, by placing an emergency voice call (e.g., an E112 call (e.g., in countries across Europe), a 911 call (e.g., in the United States), or the like) using a cellular phone, a landline phone (e.g., a pay phone), a button that initiates an in-vehicle communications device, or another suitable communications device. Automatic emergency calls, on the other hand, may be accomplished using a vehicle dedicated communications device (e.g., a telematics unit), where the device automatically places an emergency call in response to a trigger associated with the vehicular incident. During an emergency call, data, such as the time the incident occurred, the location of the vehicle, the direction of travel, a general vehicle description (e.g., make and model of the vehicle, color of the vehicle, a vehicle license plate number, vehicle identification number (VIN) per ISO 3779, and/or the like), and/or the like, is sent/provided to a local public safety authority, and the data may then be used, e.g., to provide assistance to the vehicle if needed.

In some cases, the vehicle owner may be a party to a subscription contract/agreement with a telematics service provider. The telematics service provider offers various in-vehicle and/or emergency services, which utilize an in-vehicle telematics unit to request, initiate, and/or provide the services. These services, including emergency services, are outlined in the contract and may be available to the owner so long as the contract is in force and the vehicle is then-currently located in a geographic service area defined by the telematics service provider. However, it is to be understood that the services, including the emergency services, may not be available to the vehicle from the telematics service provider in instances where the vehicle travels outside of the geographic service area. In these instances, alternative means are required to place an emergency call with, e.g., another service provider (i.e., a provider other than the one associated with the contract).

Accordingly, the example methods disclosed herein may advantageously be used to enable a telematics unit to place an emergency call even when the vehicle is then-currently located outside of the geographic service area of the telematics service provider. For instance, the telematics unit may be configured to determine where to direct an emergency call (e.g., to the telematics service provider or to another service provider) after recognizing that a vehicular incident has occurred. In some non-limiting examples, directing the emergency call to the telematics service provider is at least considered before deciding to direct the emergency call to another service provider. For example, the emergency call may be directed to the other service provider after a request for the services from the telematics service provider is first denied (e.g., due to connection failure or other issues with the wireless service provider). These methods are advantageously efficient, at least in terms of the amount of time it takes to place the emergency call and to receive emergency services when needed. Furthermore, these methods use a single communications device (e.g., a telematics unit) that is capable of operating in more than one service mode so that emergency calls can be placed with more than one service provider. This advantageously reduces the amount of hardware disposed inside the vehicle, while still being able to make emergency calls to different service providers.

It is to be understood that, as used herein, the term "user" includes any person associated with, or party to, or involved in a vehicular incident. The "user" may, for example, be a vehicle owner, operator, and/or passenger, and this term may be used interchangeably with the term subscriber/service subscriber.

Further, the term "vehicular incident" or some other variation thereof refers to an event causing some damage to a vehicle and/or one or more injuries to one or more persons involved in the vehicular incident (e.g., a vehicle occupant, a pedestrian, etc.). The term "vehicular incident" may be used interchangeably with the terms "vehicular accident," "vehicular crash", or "vehicular collision". Furthermore, a "vehicle occupant" refers to a person or an animal located inside the vehicle during the vehicular incident. The vehicle occupants may include, for example, a vehicle driver and/or one or more vehicle passengers.

A vehicular incident does not have to occur in order to initiate the methods disclosed herein. It is to be understood that a vehicle occupant may experience or witness an event (i.e., a non-vehicular incident) that prompts him/her to initiate an emergency call or request for emergency services. Non-limiting examples of non-vehicular incidents include, for example, an in-vehicle occupant experiencing a heart attack, allergic reaction, or some other medical condition, or an in-vehicle occupant witnessing an incident outside the vehicle (e.g., a bike runs into a tree or person, another car is pulled over on the side of the road, a building is on fire, etc.). In these instances, it is to be understood that the emergency call is generally manually initiated by some in-vehicle occupant as opposed to being automatically initiated by the in-vehicle telematics unit.

Yet further, a person that is "party to the vehicular incident" or "party to the non-vehicular incident" includes a person that is involved in the incident either directly or indirectly. A person who is directly involved in the incident may include, for example, an operator of the vehicle involved in the incident or the person suffering the heart attack. A person who is indirectly involved in the incident may include, for example, a pedestrian who witnessed the incident or the in-vehicle occupant who witnessed a bike crash.

Furthermore, a service provider other than a telematics service provider refers to any service provider capable of establishing a connection with the vehicle dedicated communications device, where in most emergency situations, contact with the service provider is initiated from within the vehicle (either automatically or manually) using the vehicle dedicated communications device. The service provider thereafter provides or assists in obtaining emergency assistance that is responsive to the emergency call request. It is to be understood that the other service provider is not the telematics service provider that is party to the contract/agreement with the vehicle user. An example of a service provider other than the telematics service provider includes an eCall provider, which is a public safety answering point (PSAP). As used herein, the term "eCall" refers to an emergency call that is submitted to an emergency-based service provider anywhere in the European Union. The eCall may be associated with eCall capabilities or E112 capabilities, each of which outlines a different minimum set of data that is to be transmitted when an eCall associated with eCall capabilities or E112 capabilities is made. The emergency-based service provider in these instances is referred to as the eCall provider/PSAP. In these instances, the telematics unit 14 will dial 112 and the network (e.g., a mobile network operator associated with the communications system 16) will choose an appropriate public safety answering point. In response to the eCall, the eCall provider processes the call and, if necessary, dispatches emergency personnel or other services to the caller in response to the call. For purposes of illustration, the methods described in detail below utilize an eCall provider as the other service provider. In one example, the eCall provider/PSAP dispatches other providers, such as private ambulance services, towing services, etc.

Utilizing one or more lists stored in its memory, the telematics unit disclosed herein can identify i) the type of service provider (e.g., telematics service provider or eCall service provider) and ii) any data that is to be sent to the service provider during an emergency call. To identify this information and to place a proper emergency call, the telematics unit will cross-check network country code(s) stored on one or more lists within the telematics unit with broadcasted network country codes. It is to be understood that the telematics unit 14 includes software that uses the country code as an index into a table which instructs the telematics unit 14 about the type of call to make and how much data to send (i.e., does the area support eCall, E112, or none of these services). As used herein, the term "network country code" or "NCC" as used herein is a mobile network code. The mobile network code is the country portion (i.e., country code (often referred to as CC) or mobile country code (often referred to as MCC)) of the network code on the global system for mobile telecommunications (GSM). Every GSM mobile subscriber is identified by an International Mobile Subscriber Identity (IMSI), which consists of a 3 digit Mobile Country Code (MCC), a 2 digit Mobile Network Code (MNC) which identifies the GSM network within a country, and a Mobile Subscriber Identification Number (MSIN) which uniquely identifies a subscriber within a network. To accommodate international roaming, a Mobile Subscriber Integrated Services Digital Number (MSISDN) is established. This consists of a Country Code (CC), a National Destination Code (NCD), and a Subscriber Number (SN).

Additionally, the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Also, the term "communication" is to be construed to include all forms of communication, including direct and indirect communication. As such, indirect communication may include communication between two components with additional component(s) located therebetween.

Referring now to FIG. 1, one non-limiting example of a system 10 for providing emergency services to a mobile vehicle includes the vehicle 12, a telematics unit 14, a carrier/communication system 16 (including, but not limited to, one or more cell towers 18, one or more base stations 19 and/or mobile switching centers (MSCs) 20, and one or more service providers (not shown) including mobile network operator(s)), one or more land networks 22, one or more telematics service/call centers 24, and one or more eCall or other service providers 100. In an example, the carrier/communication system 16 is a two-way radio frequency communication system.

The overall architecture, setup and operation, as well as many of the individual components of the system 10 shown in FIG. 1 are generally known in the art. Thus, the following paragraphs provide a brief overview of one example of such a system 10. It is to be understood, however, that additional components and/or other systems not shown here could employ the method(s) disclosed herein.

Vehicle 12 is a mobile vehicle, such as a motorcycle, car, truck, recreational vehicle (RV), boat, plane, etc., and is equipped with suitable hardware and software that enables it to communicate (e.g., transmit and/or receive voice and data communications) over the carrier/communication system 16.

Some of the vehicle hardware 26 is shown generally in FIG. 1, including the telematics unit 14 and other components that are operatively connected to the telematics unit 14. Examples of the other hardware 26 components include a microphone 28, a speaker 30 and buttons, knobs, switches, keyboards, and/or controls 32. Generally, these hardware 26 components enable a user to communicate with the telematics unit 14 and any other system 10 components in communication with the telematics unit 14. It is to be understood that the vehicle 12 may also include additional components suitable for use in, or in connection with, the telematics unit 14.

Operatively coupled to the telematics unit 14 is a network connection or vehicle bus 34. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few. The vehicle bus 34 enables the vehicle 12 to send and receive signals from the telematics unit 14 to various units of equipment and systems both outside the vehicle 12 and within the vehicle 12 to perform various functions, such as unlocking a door, executing personal comfort settings, and/or the like.

The telematics unit 14 is an onboard vehicle dedicated communications device that provides a variety of services, both individually and through its communication with the call (or data) center 24. The call (or data) center 24 are facilities that are owned and operated by the telematics service provider. The telematics unit 14 generally includes an electronic processing device 36 operatively coupled to one or more types of electronic memory 38, a cellular chipset/component 40, a wireless modem 42, a navigation unit containing a location detection (e.g., global positioning system (GPS)) chipset/component 44, a real-time clock (RTC) 46, a short-range wireless communication network 48 (e.g., a BLUETOOTH® unit), a vehicle data upload unit/system 41, and/or a dual antenna 50. In one example, the wireless modem 42 includes a computer program and/or set of software routines executing within processing device 36.

It is to be understood that the telematics unit 14 may be implemented without one or more of the above listed components, such as, for example, the short-range wireless communication network 48. It is to be further understood that telematics unit 14 may also include additional components and functionality as desired for a particular end use.

The electronic processing device 36 may be a micro controller, a controller, a microprocessor, a host processor, and/or a vehicle communications processor. In another example, electronic processing device 36 may be an application specific integrated circuit (ASIC). Alternatively, electronic processing device 36 may be a processor working in conjunction with a central processing unit (CPU) performing the function of a general-purpose processor. In a non-limiting example, the electronic processing device 36 (also referred to herein as a processor) includes software programs having computer readable code to initiate and/or perform one or more steps of the methods disclosed herein. For instance, the software programs may include computer readable code for determining where to direct an emergency call in response to a vehicular incident, or in response to a request from an in-vehicle user.

The location detection chipset/component 44 may include a Global Position System (GPS) receiver, a radio triangulation system, a dead reckoning position system, and/or combinations thereof In particular, a GPS receiver provides accurate time and latitude and longitude coordinates of the vehicle 12 responsive to a GPS broadcast signal received from a GPS satellite constellation (not shown).

The cellular chipset/component 40 may be an analog, digital, dual-mode, dual-band, multi-mode and/or multi-band cellular phone. The cellular chipset-component 40 uses one or more prescribed frequencies in the 800 MHz analog band or in the 800 MHz, 900 MHz, 1900 MHz and higher digital cellular bands. Any suitable protocol may be used, including digital transmission technologies such as TDMA (time division multiple access), CDMA (code division multiple access) and GSM (global system for mobile telecommunications). In some instances, the protocol may be short-range wireless communication technologies, such as BLUETOOTH®, dedicated short-range communications (DSRC), or Wi-Fi.

Also associated with electronic processing device 36 is the previously mentioned real time clock (RTC) 46, which provides accurate date and time information to the telematics unit 14 hardware and software components that may require and/or request the date and time information. In an example, the RTC 46 may provide date and time information periodically, such as, for example, every ten milliseconds.

The telematics unit 14 provides numerous services alone or in conjunction with the call/data center 24, some of which may not be listed herein, and is configured to fulfill one or more user or subscriber requests. Several examples of such services include, but are not limited to: turn-by-turn directions and other navigation-related services provided in conjunction with the GPS based chipset/component 44; airbag deployment notification and other emergency or roadside assistance-related services provided in connection with various crash and or collision sensor interface modules 52 and sensors 54 located throughout the vehicle 12; and infotainment-related services where music, Web pages, movies, television programs, videogames and/or other content is downloaded by an infotainment center 56 operatively connected to the telematics unit 14 via vehicle bus 34 and audio bus 58. In one non-limiting example, downloaded content is stored (e.g., in memory 38) for current or later playback.

Again, the above-listed services are by no means an exhaustive list of all the capabilities of telematics unit 14, but are simply an illustration of some of the services that the telematics unit 14 is capable of offering. It is to be understood that when such services are obtained from the call center 24, the telematics unit 14 is considered to be operating in a telematics service mode.

The telematics unit 14 is also configured to provide services through its communication with a service provider other than the telematics service provider. In an example, the other service provider is an eCall provider/PSAP which owns and operates an eCall call/data center 100, and the telematics unit 14 communicates with the eCall provider call/data center 100 while in an eCall service mode. Services from the eCall provider may be received, by the telematics unit 14, in instances when the services cannot be obtained from the telematics service provider. In one example, the telematics unit 14 may be denied telematics service provider services because the telematics unit 14 is then-currently located outside of a geographic service area of the telematics service provider. In such instances, the telematics unit 14 will be programmed to dial 112 (instead of the telematics service provider) and the network (e.g., a mobile network operator) will choose an appropriate eCall provider/PSAP. As such, upon recognizing that services may not be available from the telematics service provider through one or more of its call/data centers 24, or upon receiving a denial of the services (e.g., due to the inability to connect with the call/data center 24, contractual issues with the cellular service provider in a particular country or region, numbers failing to work even after one or more retry attempts, etc.), the telematics unit 14 is configured to switch from a telematics service mode to another service mode (such as, e.g., a service mode supported by the eCall provider, which is referred to herein as an eCall service mode). While operating in the eCall service mode, the telematics unit 14 may submit an emergency call via a standard emergency call procedure or protocol. For example, the eCall may be initiated by dialing 112. The telematics unit 14 will send the appropriate Minimum Set of Data (MSD) based upon specifications stored in the telematics unit memory 38 related to the NCC that is matched prior to making the eCall. This data is transmitted to the mobile network operator who would provide the call and data to the appropriate eCall provider/PSAP (similar to a typical 112/911 call).

In instances where the telematics service mode is the default setting, the telematics unit 14 is configured to switch back into the telematics service mode after operating in the eCall service mode. This may occur, e.g., when the telematics unit 14 re-enters the geographic service area of the telematics service provider and/or when the connection with the eCall provider call center 100 is complete/finished/ended. As such, the telematics unit 14 alone may be used to obtain services from more than one service provider.

Vehicle communications generally utilize radio transmissions to establish a voice channel with carrier system 16 such that both voice and data transmissions may be sent and received over the voice channel. Vehicle communications are enabled via the cellular chipset/component 40 for voice communications and the wireless modem 42 for data transmission. In order to enable successful data transmission over the voice channel, wireless modem 42 applies some type of encoding or modulation to convert the digital data so that it can communicate through a vocoder or speech codec incorporated in the cellular chipset/component 40. It is to be understood that any suitable encoding or modulation technique that provides an acceptable data rate and bit error may be used with the examples disclosed herein. Generally, dual mode antenna 50 services the location detection chipset/component 44 and the cellular chipset/component 40.

As mentioned above, data transmission may take place over the voice channel. The vehicle hardware 26 includes a vehicle data upload VDU unit/system 41 that transmit data during a voice connection in the form of packet data over a packet-switch network (e.g., voice over Internet Protocol (VoIP), communication system 16, etc.). The telematics unit 14 may include the vehicle data upload (VDU) system 41 (as shown in FIG. 1) or is interfaced to the VDU system 41, which is configured to receive raw sensor data or recording(s) from the receiver 98, packetize the data, and upload the packetized data message to the telematics service provider call/data center 24 (or other external entity, such as the eCall call center 100). In one example, the VDU 41 is operatively connected to the processor 36 of the telematics unit 14, and thus is in communication with the call/data center 24 via the bus 34 and the communication system 16. In another example, the VDU 41 may be the telematics unit's central data system that can include its own modem, processor, and on-board database. The database can be implemented using a separate network attached storage (NAS) device or be located elsewhere, such as in memory 38, as desired. The VDU 41 has an application program that handles all of the vehicle data upload processing, including communication with the call/data center 24, and the setting and processing of triggers (i.e., preset indicators of when data, recordings, etc. are to be collected and/or uploaded). Generally, the VDU system 41 is used for establishing routine connections and in some instances, maintaining access lists used to determine where to place a particular emergency call.

The microphone 28 provides the user with a means for inputting verbal or other auditory commands, and can be equipped with an embedded voice processing unit utilizing human/machine interface (HMI) technology known in the art. Conversely, speaker 30 provides verbal output to the vehicle occupants and can be either a stand-alone speaker specifically dedicated for use with the telematics unit 14 or can be part of a vehicle audio component 60. In either event and as previously mentioned, microphone 28 and speaker 30 enable vehicle hardware 26 and telematics service data/call center 24 to communicate with the occupants through audible speech. The vehicle hardware 26 also includes one or more buttons, knobs, switches, keyboards, and/or controls 32 for enabling a vehicle occupant to activate or engage one or more of the vehicle hardware components. In one example, one of the buttons 32 may be an electronic pushbutton used to initiate voice communication with the telematics service provider data/call center 24 (whether it be a live advisor 62 or an automated call response system 62') to request emergency services, for example.

It is to be understood that when the telematics unit 14 has switched into the eCall service mode, any of the vehicle hardware 26 mentioned above (e.g., the buttons, knobs, switches, etc.) may be used to initiate communication with the eCall provider call center 100. For instance, one of the vehicle occupants may press one of the pushbuttons 32 (e.g., an emergency button) to initiate a voice communication with an advisor 104, 104' at the eCall call center 100 and to request emergency services therefrom. For another instance, the eCall can be initiated by pressing a phone button and then dialing (e.g., via voice) an appropriate emergency phone number (e.g., 112).

The audio component 60 is operatively connected to the vehicle bus 34 and the audio bus 58. The audio component 60 receives analog information, rendering it as sound, via the audio bus 58. Digital information is received via the vehicle bus 34. The audio component 60 provides AM and FM radio, satellite radio, CD, DVD, multimedia and other like functionality independent of the infotainment center 56. Audio component 60 may contain a speaker system, or may utilize speaker 30 via arbitration on vehicle bus 34 and/or audio bus 58.

Still referring to FIG. 1, the vehicle crash and/or collision detection sensor interface 52 is/are operatively connected to the vehicle bus 34. The crash sensors 54 provide information to the telematics unit 14 via the crash and/or collision detection sensor interface 52 regarding the severity of a vehicle collision, such as the angle of impact and the amount of force sustained. In an example, data from the crash and/or collision sensors 54 is sent to the telematics unit 14 via the bus 34, and when the data is recognized via the processor 36, the processor 36 recognizes that an incident has occurred. The processor 36 then uses the country code (and possibly the vehicle location) to determine the proper emergency number to call and the proper data to transmit with the emergency call. In some instances, the vehicle data is transmitted to the emergency service provider for further analysis.

Other vehicle sensors 64, connected to various sensor interface modules 66 are operatively connected to the vehicle bus 34. Example vehicle sensors 64 include, but are not limited to, gyroscopes, accelerometers, magnetometers, emission detection and/or control sensors, environmental detection sensors, and/or the like. One or more of the sensors 64 enumerated above may be used to obtain vehicle data for use by the telematics unit 14 or the data/call center 24 (when transmitted thereto from the telematics unit 14) to determine the operation of the vehicle 12. Non-limiting example sensor interface modules 66 include powertrain control, climate control, body control, and/or the like. It is to be understood that some of the data received from the other vehicle sensors 64 may also trigger one or more of the methods disclosed herein. The other data may include, for example, data indicating that an airbag has been deployed, data pertaining to a sudden deceleration (e.g., upon colliding with another object such as another vehicle), data indicting a sudden increase in pressure exerted on the brake pedal (e.g., upon braking suddenly when attempting to avoid a collision), data pertaining to a sudden decrease in tire pressure (e.g., a flat tire while traveling down a road segment), or the like.

In a non-limiting example, the vehicle hardware 26 includes a display 80, which may be operatively directly connected to or in communication with the telematics unit 14, or may be part of the audio component 60. Non-limiting examples of the display 80 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like.

The electronic memory 38 of the telematics unit 14 may be configured to store data associated with the various systems of the vehicle 12, vehicle operations, vehicle user preferences and/or personal information, and the like. The electronic memory 38 is further configured to store a table including one or more lists of country codes. One of these lists may include, for example, country codes of those countries within which the telematics service provider offers service coverage. Another of these lists may include, for example, country codes of countries within which another service provider (such as the eCall provider) offers coverage. The table may also include additional lists of still other service providers. In some examples of the methods disclosed herein, the telematics unit 14 receives a broadcasted network country code (NCC) that identifies the country within which the broadcast is being distributed, and then compares the broadcasted NCC to the table stored in the memory 38 to determine if the broadcasted NCC is present in the table. The telematics unit 14 determines where to direct an emergency call based, at least in part, on the existence or the absence of the broadcasted NCC in the stored table. The table may also include a list of capabilities for certain service providers. For example, eCall providers may be associated with minimum sets of data that are required to be sent when making a particular eCall. Details of the table itself and how the table is updated will be described further below.

A portion of the carrier/communication system 16 may be a cellular telephone system or any other suitable wireless system that transmits signals between the vehicle hardware 26 and land network 22. According to an example, the wireless portion of the carrier/communication system 16 includes one or more cell towers 18, base stations 19 and/or mobile switching centers (MSCs) 20, as well as any other networking components required to connect the wireless portion of the system 16 with land network 22. It is to be understood that various cell tower/base station/MSC arrangements are possible and could be used with the wireless portion of the system 16. For example, a base station 19 and a cell tower 18 may be co-located at the same site or they could be remotely located, and a single base station 19 may be coupled to various cell towers 18 or various base stations 19 could be coupled with a single MSC 20. A speech codec or vocoder may also be incorporated in one or more of the base stations 19, but depending on the particular architecture of the wireless network 16, it could be incorporated within an MSC 20 or some other network components as well.

Land network 22 may be a conventional land-based telecommunications network that is connected to one or more landline telephones and connects the wireless portion of the carrier/communication network 16 to the call/data center 24. For example, land network 22 may include a public switched telephone network (PSTN) and/or an Internet protocol (IP) network. It is to be understood that one or more segments of the land network 22 may be implemented in the form of a standard wired network, a fiber or other optical network, a cable network, other wireless networks such as wireless local networks (WLANs) or networks providing broadband wireless access (BWA), or any combination thereof.

The call/data centers 24 of the telematics service provider are designed to provide the vehicle hardware 26 with a number of different system back-end functions. For example, the call/data centers 24 may be configured to receive and, in some cases, respond to calls from the telematics unit 14 requesting emergency services.

According to the example shown in FIG. 1, one call/data center 24 generally includes one or more switches 68, servers 70, databases 72, live and/or automated advisors 62, 62', processing equipment (or processor) 84, as well as a variety of other telecommunication and computer equipment 74 that is known to those skilled in the art. These various telematics service provider components are coupled to one another via a network connection or bus 76, such as one similar to the vehicle bus 34 previously described in connection with the vehicle hardware 26.

The processor 84, which is often used in conjunction with the computer equipment 74, is generally equipped with suitable software and/or programs enabling the processor 84 to accomplish a variety of call/data centers 24 functions. The software and/or programs are further configured to perform one or more steps of the example methods disclosed herein. The various operations of the call/data center 24 are carried out by one or more computers (e.g., computer equipment 74) programmed to carry out some of the tasks of the method(s) disclosed herein. The computer equipment 74 (including computers) may include a network of servers (including server 70) coupled to both locally stored and remote databases (e.g., database 72) of any information processed.

Switch 68, which may be a private branch exchange (PBX) switch, routes incoming signals so that voice transmissions are usually sent to either the live advisor 62 or the automated response system 62', and data transmissions are passed on to a modem or other piece of equipment (not shown) for demodulation and further signal processing. The modem preferably includes an encoder, as previously explained, and can be connected to various devices such as the server 70 and database 72.

It is to be appreciated that the call/data center 24 may be any central or remote facility, manned or unmanned, mobile or fixed, to or from which it is desirable to exchange voice and data communications. As such, the live advisor 62 may be physically present at the call/data center 24 or may be located remote from the call/data center 24 while communicating therethrough.

The eCall provider also owns and operates one or more data/call centers 100 that may, in an example, be similar to the telematics service provider's data/call centers 24 in that the eCall provider data/call center 100 may include one or more switches 102, servers 106, a processor 108, database(s) 114, and one or more live and/or automated advisors 104, 104', as well as a variety of other telecommunication and computer equipment 110 that is known to those skilled in the art. These various eCall provider data/call center 100 components are coupled to one another via a network connection or bus 112, such as one similar to the bus 76 at the data/call center 24. The switches 102, servers 106, processor 108, advisors 104, 104', database(s) 114, and computer equipment 110 are substantially the same as described above for the call/data center 24, except the components are specifically designed (e.g., with specific software routines) to accomplish eCall provider functions. In particular, it is to be understood that the processor 108 and/or other computer equipment 110 include software and/or programs that are configured to perform one or more steps of the example methods disclosed herein.

The communications network provider 90 generally owns and/or operates the carrier/communication system 16. In an example, the communications network provider 90 is the Global System for Mobile Communications available in the European Union. In non-European countries, the communications network provider 90 may be any local communications cellular service network. The communications network provider 90 includes a mobile network operator that monitors and maintains the operation of the communications network 90. The network operator directs and routes calls, and troubleshoots hardware (cables, routers, network switches, hubs, network adaptors), software, and transmission problems. It is to be understood that, although the communications network provider 90 may have back-end equipment, employees, etc. located at the telematics service provider data/call center 24, the telematics service provider is a separate and distinct entity from the network provider 90. In an example, the equipment, employees, etc. of the communications network provider 90 are located remote from the data/call center 24 (as shown in FIG. 1). The communications network provider 90 provides the user with telephone and/or Internet services, while the telematics service provider provides a variety of telematics-related services (such as, for example, those discussed hereinabove). It is to be understood that the communications network provider 90 may interact with the data/call centers 24 and/or 100 to provide services (such as emergency services) to the user.

The system 10 may further include a broadcast network (not specifically labeled in FIG. 1) which is a channel that is capable of broadcasting transmissions to telematics equipped vehicles 12. The broadcast network is part of, or in selective and operative communication with, the network provider 90; and is configured to broadcast messages (e.g., data messages such as SMS messages including the NCC) to the telematics units 14. Typically, the broadcast takes place over a dedicated channel, such as a service channel, which is used solely for broadcasts regarding NCCs. As used herein, the term "broadcasting" refers to the process of transmitting a message over airwaves to a plurality of receivers (e.g., the receiver 98 that is operatively connected to the telematics unit 14). In an example, the broadcasted NCC is a numeric code (which may resemble something like 0 999, or the like) that is used to identify a country within which the broadcast is distributed. The broadcast network may be any suitable channel (e.g., short message centers (SMSCs), which is a system specifically designed to send, deliver, and/or transmit short message service (SMS) messages to a desired destination or a GSM equivalent to SMSCs) that is capable of broadcasting NCCs to vehicles located in a particular geographic region. The generated message may be broadcast in the form of radio signals (e.g., traveling through one or more cellular towers 18 of the carrier/communication system 16), which are transmitted to the particular geographic region (e.g., the country) associated with the NCC being broadcast.

In an example, the broadcast is directed to all subscriber vehicles 12 with GSM telephony equipment then-currently located within that particular country. In one example, the telematics units 14 of the vehicles 12 are configured to run a background scan (e.g., whenever the unit 14 is powered on) of the broadcast channel in order to receive the NCC message whenever the broadcast is transmitted. In another example, the receiver 98 is configured with appropriate software routines, which monitor the broadcasting channel for an NCC. It is to be understood that GSM receivers attach to cells similar to the way cellular telephones in the United States register with networks. As such, the country code is broadcast, and a receiver 98 will receive the country code. When an event/trigger occurs that requires the unit to make a call, this NCC information will then be evaluated by the telematics unit 14 to determine the appropriate course of action (i.e., call to telematics service provider, auto eCall to PSAP, or manual eCall to PSAP).

Upon recognizing the NCC broadcasted over the channel, via the processor 36 operating suitable software and/or programs, the telematics unit 14 utilizes the NCC to determine where an emergency call should be directed. The determining of where to direct the emergency call will be described in further detail below at least in conjunction with FIGS. 2 and 3.

While not shown in FIG. 1, it is to be understood that in some instances, the telematics service provider operates the data center 24, which receives voice or data calls, analyzes the request associated with the voice or data call, and transfers the call to an application specific call center (not shown) associated with the telematics service provider. It is to be understood that the application specific call center may include all of the components of the data center 24, but is a dedicated facility for addressing specific requests, needs, etc. Examples of such application specific call centers are emergency services call centers, navigation route call centers, in-vehicle function call centers, or the like.

Example methods of providing emergency services to the mobile vehicle 12 will now be described in detail at least in conjunction with FIGS. 2 and 3. More specifically, one of the methods will be described below in conjunction with FIG. 2, while the remaining methods will be described in conjunction with FIG. 3.

Figure 2:
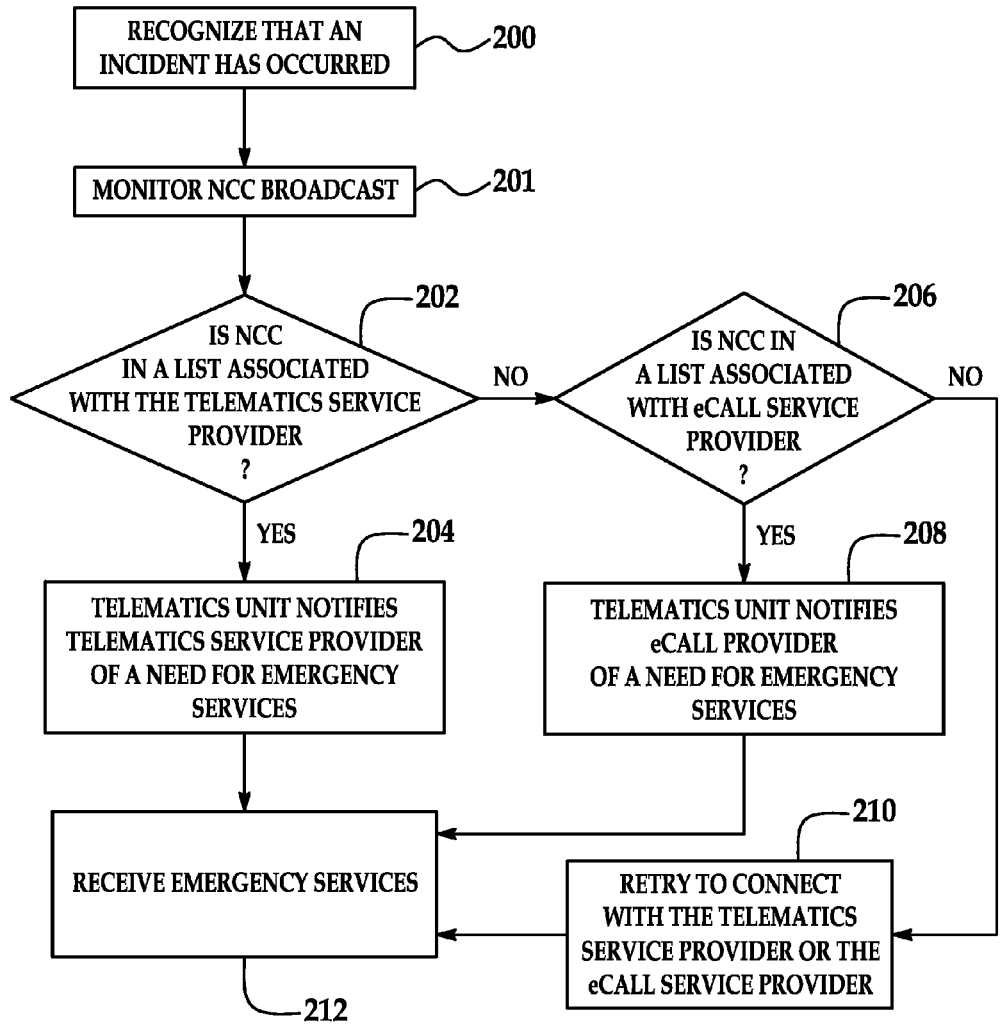
FIG. 2 is a flow diagram depicting an example of a method for providing emergency services to a mobile vehicle.

Referring now to FIG. 2, one of the methods for providing emergency services to a telematics unit 14 includes recognizing that a vehicular (or in some instances, a non-vehicular) incident has occurred (as shown by reference numeral 200). In an example, the telematics unit 14 recognizes that a vehicular incident has occurred upon receiving data from one or more of the vehicle sensors 54, 64 via the bus 34. For instance, a vehicular incident may be recognized upon receiving data from the sensor 54 of a measured vehicle indentation of the driver side front bumper. The vehicle incident may also or otherwise be recognized by the telematics unit 14 upon receiving other data such as a sudden, rapid deceleration of the vehicle 12 (perhaps a rapid breaking action in response to an attempt at avoiding a collision), the activation of a driver side airbag, or other the similar triggers that may indicate the existence of a vehicular incident. It is to be understood that as soon as any of this data is received by the telematics unit 14, a vehicular incident is automatically recognized. In these instances, emergency calls are initiated without user interaction.

The recognizing of the incident (especially a non-vehicular incident) may also be accomplished by perceiving the incident, and then notifying the telematics unit 14 that an incident has occurred. The incident may be perceived, e.g., by an occupant of the vehicle 12 involved in the incident, where the vehicle occupant realizes that i) the vehicle 12 has been damaged, and/or ii) one or more of the vehicle occupants may be injured, and/or a person, animal, or property outside the vehicle 12 is or may become damaged, injured, or the like. Upon perceiving the incident, the vehicle occupant may actuate one of the buttons 32 that is associated with requests for emergency services or may touch an emergency icon on a touchscreen of the display 80. In an example, upon actuating the emergency button 32 or icon, the processor 36 recognizes that a vehicular incident has occurred.

It is to be understood that, in some instances, the emergency button 32 may be actuated when emergency services are not needed (such as, e.g., by accidentally actuating the emergency button 32 instead of the telematics data/call center in-vehicle button when a navigation route is desired). In an example, when the emergency button 32 is actuated, the telematics unit 14 may verify that a vehicular incident did in fact occur before continuing with the method. This verification may be accomplished, for example, by submitting a request to one or more of the vehicle sensors 54, 64 to provide then-current data to the telematics unit 14, and the processor 36 will deduce from the data that a vehicle incident did in fact occur. Verification may otherwise be accomplished by requesting, via the telematics unit 14, the vehicle occupant to indicate that a vehicular incident has in fact occurred. The user indication may be accomplished, for example, via i) a verbal verification by reciting that an incident has occurred into the microphone 28, and/or ii) a physical verification by, e.g., actuating a button or touchscreen icon, where the button or icon, when actuated, indicates that, yes, an incident has in fact occurred.

Once the vehicular incident has been recognized by the telematics unit 14, prior to submitting an emergency call to the data/call center 24, the processor 36 determines where to direct the emergency call. This determination may be accomplished by monitoring the broadcast channel for an NCC broadcast message (as shown by reference numeral 201) and then comparing the broadcasted NCC to one or more lists contained in the table stored in the memory 38 of the telematics unit 14. In an example, the broadcast channel is substantially continuously monitored by the receiver 98 in the vehicle 12 for NCC broadcast messages. The monitoring may be accomplished prior to recognizing that the vehicular incident has occurred so that, when an incident has been recognized, the processor 36 may immediately extract the next NCC broadcast message received. The monitoring may otherwise be accomplished as soon as a vehicular incident has been recognized, and then the NCC is extracted from the broadcast message as soon as the message is received by the receiver 98.

In many instances, the NCC message is consistently broadcasted so that vehicles 12 can receive the message regardless of the time of day they are traveling.

In an example, the processor 36 compares the NCC extracted from the broadcast message (also referred to herein as the broadcasted NCC) to a Telematics Provider List contained in the table (as shown by reference numeral 202). As stated above, the Telematics Provider List includes the country codes of each country where services from the telematics service provider are available. If, from the comparison, the broadcasted NCC is found in the Telematics Provider List, the processor 36 determines that the emergency call should be directed to the data/call center 24 of the telematics service provider. This determination is based, at least in part, on the fact that if the broadcasted NCC is contained in the list, then the vehicle 12 must be then-currently located within a country where services from the telematics service provider are available.

Once the processor 36 finds that the broadcasted country code is contained in the Telematics Provider List, while in the telematics service mode, the processor 36 directs the telematics unit 14 to place an emergency call to the data/call center 24. The emergency call is used to notify the telematics service provider (through data/call center 24) of a need for emergency services (as shown by reference numeral 204). For example, the telematics unit 14 automatically establishes a voice connection with the telematics service provider data/call center 24 (e.g., over a circuit-switched voice channel). During the voice connection, the emergency call is received by the switch 68 which routes the call to an appropriate advisor 62, 62', who/that will assist the in-vehicle occupant(s) with the emergency service request. In instances where the center 24 is a data center, the switch 68 routes the call to a specific call center (e.g., a call center specifically designed to handle emergency calls), and the call center will assist the caller with the emergency service request.

During the emergency voice call, the in-vehicle occupant(s)/caller verbally submits a request for emergency services from the data/call center 24. For instance, once the connection is made and the call has been routed to the appropriate advisor 62, 62', the caller may recite in the microphone 28 something like "I've been in a car accident, and need some help". In instances where the vehicle occupant is capable of providing additional information to the advisor 62, 62' pertaining to the vehicular incident (such as, e.g., the location of the vehicle 12, information identifying the vehicle 12 (such as, e.g., the make, model, and year of the vehicle), the identity of the occupants inside the vehicle, etc.), this information may also be recited to the service provider advisor 62, 62' through the microphone 28. If, however, the in-vehicle occupant(s)/caller cannot verbally recite the information, the advisor 62, 62' and/or processor 84 may obtain at least some of the information (e.g., the vehicle identification information, name and address of the vehicle owner, etc.) from a user profile stored in one of the databases 72. Other information pertaining to the incident may otherwise be obtained by querying the telematics unit 14 for vehicle data such as data obtained directly from the vehicle sensors 54, 64 during the incident. This information may be used, by the advisor 62, 62', to deduce the severity of the incident so that the appropriate type of service/help may be provided to the vehicle 12.

In another example, the telematics unit 14 automatically establishes a data connection with the data/call center 24 (e.g., over a packet-switched data channel), and the data call is automatically processed at the data/call center 24. In addition to a notification that a vehicular incident has occurred, the data call may also include other information relevant to the incident (e.g., vehicle identification information, vehicle data obtained, e.g., from the sensors 54, 64, and/or the like). This information may be provided to the data/call center 24 in the form of packet data. Any information not contained in the data connection (e.g., the identification information of the vehicle owner, etc.) may be retrieved from the user profile stored in the database 72. Any other information that the data/call center 24 may need to estimate the type of emergency services that are needed may also be obtained by submitting a voice call directly to the vehicle 12, and verbally requesting the information from the vehicle occupants.

Once the advisor 62, 62' and/or processor 84 at the data/call center 24 has determined the type of emergency services needed (if any), the advisor 62, 62' and/or processor 84 will contact an emergency service provider or dispatch services, based on the service provider's scope of capabilities (as shown by reference numeral 212). In some instances, emergency services may be provide over the phone, for example, an advisor 62, 62' may link the vehicle 12 to an emergency services contact who can provide a user with instructions/directions on how to deal with the crisis, e.g., on how to assist a passenger whose airbag has deployed, how to perform CPR, or the like.

Referring back to the step when the processor 36 compares the broadcasted NCC with the Telematics Provider List, if the broadcasted NCC is not found in this list, the processor 36 compares the broadcasted NCC with another list of country codes contained in the table (as shown by reference numeral 206). This other list includes country codes associated with a service provider other than the telematics service provider. In an example, the other list includes country codes of countries covered by the eCall provider and, as stated above, the other list is referred to herein as the eCall Provider List. If, from the comparison, the broadcasted NCC is not contained in the Telematics Provider List but is contained in the eCall Provider List, the processor 36 determines that the emergency call should be directed to the data/call center 100 of the eCall provider. This determination is based, at least in part, on the fact that if the broadcasted NCC is contained in the eCall Provider list, then the vehicle 12 must be then-currently located within a country where services from the eCall provider are available.

Upon making the determination that the emergency call should be directed to the eCall data/call center 100, the processor 36 switches the telematics unit 14 from the telematics service mode into an eCall service mode, and at least a data connection is automatically established between the telematics unit 14 and the eCall data/call center 100. The data call will include the transmission of at least the minimum set of data required to be sent during any eCall based upon the specifications of the eCall to be made (e.g., eCall specification, E112 specifications, etc.). It is to be understood that during the data connection, the eCall data/call center 100 is notified of a need for emergency services (as shown by reference numeral 208). A voice call may also be established. If a voice connection is made, the call is received by the switch 102 at the eCall data/call center 100, which routes the call to an appropriate advisor 104, 104'. The advisor 104, 104' then assists the caller during the emergency call. The advisor 104, 104' will request and/or obtain information relevant to the vehicular incident from the caller/vehicle occupant(s) (e.g., by asking the caller questions) or from the vehicle 12 (e.g., by querying the telematics unit 14 for the information). In some cases, the eCall data/call center 100 may query additional information from the telematics service provider via a voice call between respective advisors 62, 62', 104, 104'. The advisor 62, 62' may then query the data center systems, where the processor 84 responds to the query and retrieves the information from the user profile stored in the database 72. The advisor 62, 62' may then use the data center system to transmit the data via a communication system linking the two entities 24 and 100. Additional information beyond the initial query from the eCall advisor 104, 104' may be transmitted at the discretion of the data center advisor 62, 62', and then the eCall provider could use the information to assist the user. It is to be understood that the telematics unit 14 may initially transmit (with the MSD) information to the eCall provider which identifies the telematics service provider with which the vehicle 12 is registered.

In an example, the country codes included in the eCall Provider List have associated therewith an eCall deployment status, a public safety answering point, and/or contact information for a public safety answering point. This information may be used, by the telematics unit 14, for example, to identify the minimum data set to be sent with the eCall. The unit 14 will then dial 112 and be connected with the mobile network operator (e.g., Vodafone, T-MOBILE®, ETC.). The MSD, including latitude and longitude, will be sent to the mobile network operator, who will then transmit the information to an appropriate eCall provider/PSAP, who will dispatch appropriate emergency service providers and/or render emergency services via the phone.

It is to be understood that the operating mode of the telematics unit 14 is generally designated as having the telematics service mode as its default setting. The default setting may be established, for example, upon manufacturing of the telematics unit 14 or during activation and/or registration of the telematics unit 14 with the telematics service provider or the wireless service provider, depending upon the method of provisioning. As such, when the telematics unit 14 is directed to establish a connection with the data/call center 100 of the eCall provider, the default setting is temporarily overridden by the eCall service mode, and the eCall service mode may be used by the telematics unit 14 so long as the telematics unit 14 is connected with the eCall data/call center 100 and/or the telematics unit 14 is outside of the geographic area serviced by the telematics service provider. When the connection is broken (e.g., finished, completed, etc.) or when the telematics unit 14 travels back into the geographic service region of the telematics service provider, the processor 36 automatically switches the telematics unit 14 back into the telematics service mode. The telematics service mode is then used by the telematics unit 14 until a need arises to switch the telematics unit 14 into the eCall service mode again. It is to be understood, however, that the default operating mode may be overridden under certain circumstances. For example, if the call is dropped accidentally, the telematics unit 14 may be programmed to attempt to re-establish communication with the eCall provider at least one time, in accordance with eCall guidelines. Alternatively, if one of the user or the eCall provider realizes that the connection established between the telematics unit 14 and the eCall data/call center 100 is weak, and the connection may inadvertently be dropped, the user may hang up and attempt to redial 112 manually.

In instances where the processor 36 determines that the broadcasted NCC is not contained in neither the Telematics Provider List nor in the eCall Provider List, the processor 36 may be programmed to attempt to contact the telematics service provider and/or an eCall provider anyway in order to obtain emergency services, as shown at reference numeral 210. If the call(s) is/are unable to be connected, the processor 36 will conclude that the vehicle 12 is then-currently located in a geographic area that is not supported by the telematics service provider or the eCall provider. In this example, the processor 36 will notify the vehicle occupant of the same. Upon receiving this notification, the vehicle occupant has the discretion to make a direct call to a local authority (e.g., a police department, fire department, etc.) and request emergency services therefrom.

Figure 3:
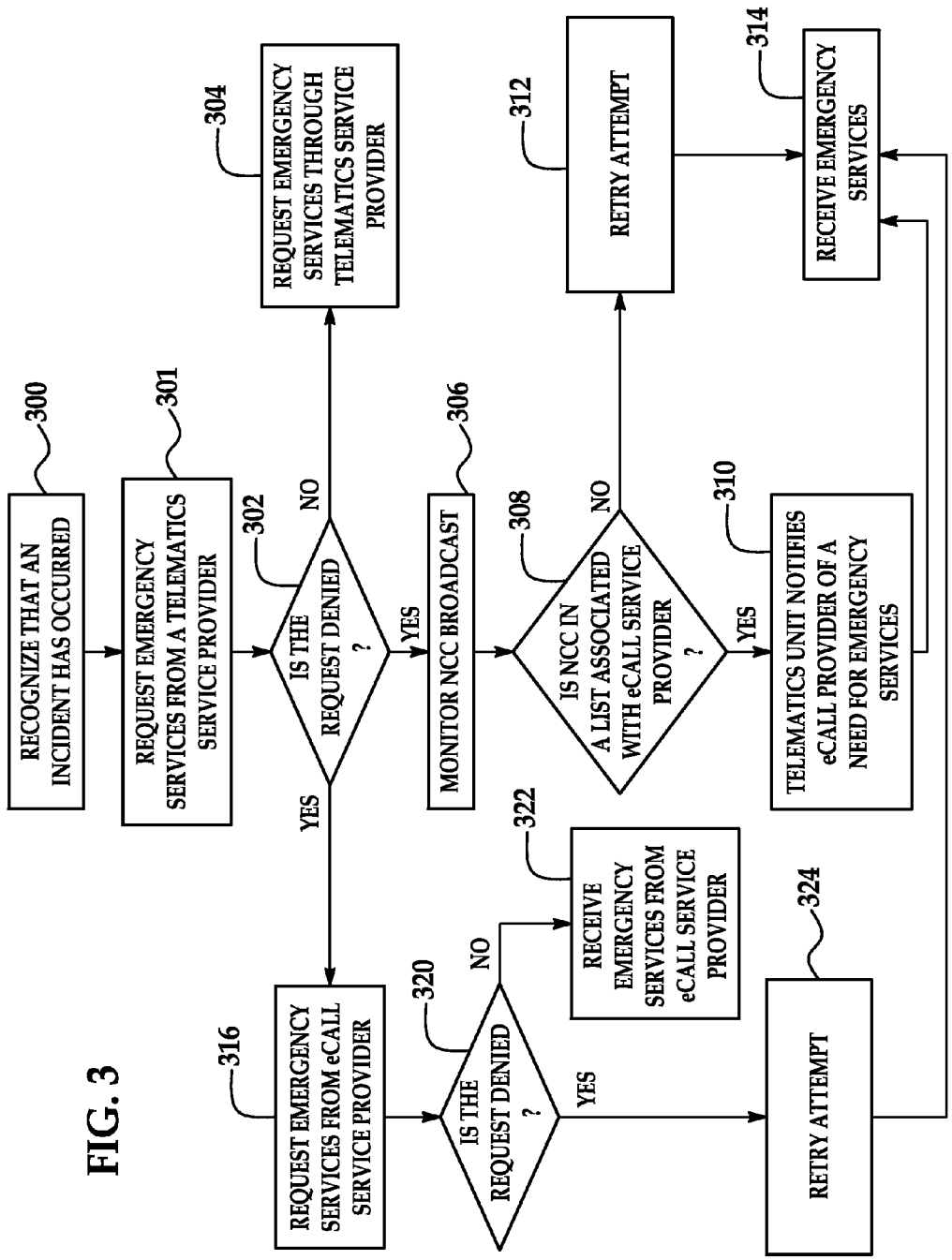
FIG. 3 is a flow diagram depicting examples of other methods for providing emergency services to a mobile vehicle.

Referring now to FIG. 3, another method for providing emergency services to a telematics unit 14 also includes recognizing that an incident (vehicular or non-vehicular) has occurred (as shown by reference numeral 300). In an example, this recognizing may be accomplished in a similar manner as that described above for the method described in conjunction with FIG. 2. Upon recognizing that an incident has occurred, the telematics unit 14 automatically submits a request for emergency services from the telematics service provider (as shown by reference numeral 301). In an example, the request is automatically submitted when the telematics unit 14 attempts to establish a voice connection (e.g., using a circuit-switched voice channel) or a data connection (e.g., using a packet-switched data channel) with the telematics service data/call center 24. If the connection is established, the telematics unit 14 submits a demand for emergency services. If however, a connection cannot be established, the request for emergency services is denied by virtue of the fact that a connection cannot be made. This may occur, for example, when the network carrier 90 that the telematics service provider uses does not have wireless coverage within the region the vehicle 12 is traveling, or contractual issues exist with the wireless service provider in the region, etc. The determination of whether or not the request is denied is generally depicted by reference numeral 302 in FIG. 3.

It is to be understood that if the denial of services is due to technical difficulties at the call/data center 24, retry strategies are in place so that the telematics unit 14 will attempt to reconnect with the call/data center 24 before attempting to obtain services using another provider.

In instances where a connection is established between the telematics unit 14 and the telematics service data/call center 24, the processor 36 assumes that the telematics unit 14 is then-currently located with the geographic service area of the telematics service provider. The request for emergency services may then be submitted to the telematics service data/call center 24 (as shown by reference numeral 304). More specifically, the call is received by the switch 68 at the data/call center 24, which routes the call to the appropriate advisor 62, 62'. During the connection, information pertaining to the incident may be obtained by the service data/call center 24 from the caller/in-vehicle occupant, the user profile stored in the database 72, and/or from various vehicle systems and/or sensors as similarly described above. This information may be used, by the data/call center 24, to deduce the type of emergency services that are needed. The emergency services may then be provided to and received by the vehicle 12 (as shown by reference numeral 314).

In instances where the telematics unit 14 cannot establish a connection with the telematics service data/call center 24 (as shown again by reference numeral 302), the method includes monitoring the broadcast channel for an NCC broadcast message (as shown by reference numeral 306) and then comparing the broadcasted NCC to a list contained in the table stored in the memory 38 of the telematics unit 14. In an example, the broadcast channel is substantially continuously monitored by the receiver 98 in the vehicle 12 for NCC broadcast messages. The processor 36 immediately extracts the NCC from the broadcasted message as soon as the request for emergency services from the telematics service data/call center 24 has been denied (e.g., the connection between 14 and 24 cannot be established). The extracted NCC may then be used by the processor 36 to determine where to direct the emergency call.

In an example, the processor 36 compares the broadcasted NCC to another list of country codes contained in the table, where the other list is associated with a service provider other than the telematics service provider. In an example, the other list includes country codes associated with countries covered by the eCall provider (i.e., the eCall Provider List) (as shown by reference numeral 308). If, from the comparison, the broadcasted NCC is contained in the eCall Provider List, the processor 36 determines that the emergency call may be directed to the eCall provider's data/call center 100. Accordingly, the processor 36 directs the telematics unit 14 to switch into the eCall service mode, and then directs the telematics unit 14 to place the emergency call with the eCall data/call center 100. The emergency call is used to notify the eCall data/call center 100 of a need for emergency services (as shown by reference numeral 310). The emergency call may, for example, be accomplished by establishing a voice connection (e.g., over a circuit-switched voice channel) or a data connection (e.g., over a packet-switched data channel) with the eCall data/call center 100. If a voice connection is established, the emergency call is received by the switch 102 which routes the call to an appropriate advisor 104, 104', who/that will assist the caller with the emergency service request.

During the emergency voice call, the caller/in-vehicle occupant(s) verbally submits a request for emergency services from the eCall data/call center 100. Also during the voice call, the advisor 104, 104' may request additional information such as the location of the vehicle 12, vehicle identification information, information pertaining to the vehicle occupants (such as the number of vehicle occupants, the severity of injury, etc.) and/or the like. In some cases, the eCall data/call center 100 (via processor 106) may query the i) the telematics unit 14 for vehicle data associated with the incident, and/or ii) the telematics service data/call center 24 for the additional information (retrieved, e.g., from the user profile) if the caller is unable to provide the information.

If a data connection is established with the eCall data/call center 100, the data call may be automatically processed by the eCall data/call center 100 upon making the connection. In addition to a notification that an incident has occurred, the data call may also include the additional information described above that is relevant to, for example, the calling vehicle 12 (e.g., vehicle identification information) or a vehicular incident (e.g., vehicle data obtained, e.g., from the sensors 54, 64), and/or the like. The eCall data/call center 100 may also query i) the telematics unit 14 for vehicle data, or ii) the data/call center 24 for any information not contained in the packet data (e.g., the identification information of the vehicle owner, etc., which may be retrieved from the user profile stored in the database 72 at the telematics service data/call center 24).

The information received by the eCall data/call center 100 may be used to deduce the type of emergency services needed. If appropriate, the services may be provided over the phone. In other instances, personnel capable of rendering suitable services are dispatched from appropriate entities (e.g., tow truck, fire stations, police stations, hospitals, etc., or combinations thereof), and care is ultimately provided at the scene of the incident (as shown by reference numeral 314).

Referring back to when the processor 36 compares the broadcasted NCC with the eCall Provider List (at reference numeral 308 in FIG. 3), if the broadcasted NCC is not found in the eCall Provider List, the processor 36 assumes that the telematics unit 14 is then-currently located in a geographic area not covered by either the telematics service provider or the eCall provider. In these instances, the telematics unit 14 may be programmed to attempt to contact the telematics service provider and/or an eCall provider anyway in order to obtain emergency services, as shown at reference numeral 312. If the call(s) is/are unable to be connected, the processor 36 will conclude that the vehicle 12 is then-currently located in a geographic area that is not supported by the telematics service provider or the eCall provider. In this example, the processor 36 will notify the vehicle occupant of the same. Upon receiving this notification, the vehicle occupant has the discretion to make a direct call to a local authority (e.g., a police department, fire department, etc.) and request emergency services therefrom. Alternatively, if the retry attempts result in a connection, emergency services may be obtained from the entity (telematics service provider to eCall provider) to which the vehicle 12 is connected.

In still another example of the method disclosed herein, once the request for emergency services (from the telematics service provider) has been denied (as shown and discussed in reference to reference numeral 302 in FIG. 3), the processor 36 automatically switches the telematics unit 14 from the telematics service mode into the eCall mode so that the telematics unit 14 can submit a request for emergency services to the eCall provider data/call center 100 (as shown by reference numeral 316). In an example, the request is automatically submitted when the telematics unit 14 attempts to establish a voice connection (e.g., using a circuit-switched voice channel) or a data connection (e.g., using a packet-switched data channel) with the eCall data/call center 100. If the connection is established, the telematics unit 14 submits a demand for emergency services, and the services are rendered by the eCall provider (e.g., by dispatching a proper authority). If however, a connection cannot be established, the request for emergency services is denied. The determination of whether or not the request is denied (e.g., by a mobile network operator) is generally depicted by reference numeral 320 in FIG. 3.

In instances where a connection is established between the telematics unit 14 and the eCall data/call center 100, the processor 36 assumes that the telematics unit 14 is then-currently located with the geographic service area of the eCall provider. The request for emergency services may then be submitted to the eCall data/call center 100. More specifically, the call is received by the switch 102 at the eCall data/call center 100, which routes the call to the appropriate advisor 104, 104'. During the connection, information pertaining to the incident may be obtained by the eCall data/call center 100 at least from the caller (as similarly described above). This information may be used, by the eCall data/call center 100, to deduce the type of emergency services that are needed. The emergency services may then be provided in any of the manners previously described herein (as shown by reference numeral 322).

In instances where the telematics unit 14 cannot establish a connection with the eCall provider (as shown again by reference numeral 320), the method includes attempting to reconnect with the eCall provider (as shown by reference numeral 324), and emergency services may be received therefrom when the call is connected (as shown again by reference numeral 314).

It is to be understood that any of the methods described above may be used to provide emergency services to the mobile vehicle 12. It is further to be understood that for those methods that involve comparing the broadcasted NCC with one or more lists contained in the table stored in the telematics unit 14, the lists are updated. In an example, updating of the list may be accomplished periodically (e.g., every week, every month, etc.), or as soon as an update is available from, e.g., the telematics service provider, the eCall provider, or another service provider either alone or in conjunction with the cellular service provider, GSM, or other wireless carrier. The updates will come from one of these sources, and the telematics service provider will manage the information as part of routine maintenance processes (e.g., during routine calls from the telematics unit 14 to the data center 24 and/or routine calls to the telematics unit 14 from the data center 24). In an example, updating of the list may also be accomplished dynamically, and the method includes receiving, at the telematics service provider from the eCall provider, data pertaining to a new country code, a new deployment status, a new eCall provider/public safety answering point, and/or new contact information for an existing eCall provider/public safety answering point. Upon receiving the data, the processor 84 at the telematics service data/call center 24 incorporates the data into the table, thereby updating the table. The telematics service data/call center 24 then establishes a data connection with the telematics unit 14 (e.g., a packet data session) and transmits the updated table to the telematics unit 14. The updated table is then stored in the memory 38 of the telematics unit 14. The updates replace any previous data, unless the telematics unit 14 is instructed to update a portion of a table (e.g., Telematics Provider List), but not another portion (e.g., eCall Provider List).

In the examples disclosed herein, it is to be understood that when the incident is not a vehicular incident, any data call made may not include details of the non-vehicular incident, however, in most instances, the in-vehicle occupants will be able to relay details of the incident via a voice connection.

While several examples have been described in detail, it will be apparent to those skilled in the art that the disclosed examples may be modified. Therefore, the foregoing description is to be considered exemplary rather than limiting.

The invention claimed is:

1. A method of providing emergency services to a mobile vehicle, comprising:
   via a telematics unit operatively disposed in the mobile vehicle, monitoring a network country code broadcast from a communications network provider;
   via a processor operatively associated with the telematics unit, comparing the network country code with a first list of country codes stored in an electronic memory operatively associated with the telematics unit, the first list being associated with a telematics service provider; and
   from the comparing, determining where to direct an emergency call by the telematics unit, the determining including identifying the type of service provider to call;
   wherein:
       when the network country code is found in the first list, then the method further includes directing the telematics unit, via the processor, to notify the telematics service provider, via a wireless connection, of a need for emergency services; or
       when the network country code is not found in the first list, the method further includes:
           comparing the network country code with a second list of country codes stored in the electronic memory, the second list being associated with a service provider other than the telematics service provider; and
           when the network country code is found in the second list, directing the telematics unit, via the processor, to place an emergency call with the service provider other than the telematics service provider.

2. The method as defined in claim 1 wherein the first list of country codes includes country codes of countries covered by the telematics service provider according to a telematics subscription agreement.

3. The method as defined in claim 1 wherein the service provider other than the telematics service provider is an eCall service provider, and wherein the second list of country codes includes country codes of countries covered by the eCall service provider.

4. The method as defined in claim 3 wherein each of the country codes included in the second list has associated therewith at least one of eCall deployment status, a public safety answering point, or contact information for a public safety answering point.

5. The method as defined in claim 1 wherein the first and second lists are provided in a table, and wherein the method further comprises dynamically updating the table by:
receiving, at the telematics service provider, data pertaining to a new country code, a new deployment status, a new public safety answering point, new contact information for a public safety answering point, or combinations thereof from the service provider;
incorporating the data into the table at the telematics service provider, thereby obtaining an updated table;
transmitting, via the wireless connection, the updated table from the telematics service provider to the telematics unit in the mobile vehicle; and
storing the table in the electronic memory operatively associated with the telematics unit.

6. The method as defined in claim 1 wherein the communications network provider is the Global System for Mobile Communications available in the European Union.

7. A method of providing emergency services to a mobile vehicle, comprising:
automatically notifying a telematics service provider, via a wireless connection, of a need for emergency services, the notifying including a request for the emergency services;
receiving a denial of the request for the emergency services; and one of:
i) via a telematics unit operatively disposed in the mobile vehicle, monitoring a network country code broadcast from a communications network provider;
via a processor operatively associated with the telematics unit, comparing the network country code with a list of country codes stored in an electronic memory operatively associated with the telematics unit, the list being associated with a service provider other than the telematics service provider; and
when the network country code is found in the list, directing the telematics unit, via the processor, to automatically place an emergency call with the service provider other than the telematics service provider; or
ii) directing the telematics unit, via the processor associated therewith, to place an emergency call with the service provider other than the telematics service provider, the emergency call including a request for emergency services.

8. The method as defined in claim 7 wherein the service provider other than the telematics service provider is an eCall service provider, and wherein the list of country codes includes country codes of countries covered by the eCall service provider.

9. The method as defined in claim 8 wherein each of the country codes included in the list has associated therewith at least one of an eCall deployment status, a public safety answering point, or contact information for a public safety answering point.

10. The method as defined in claim 7 wherein: the network country code is compared to the list of country codes; the list is provided in a table; and the method further comprises dynamically updating the table by:
receiving, at the telematics service provider, data pertaining to a new country code, a new deployment status, a new public safety answering point, new contact information for a public safety answering point, or combinations thereof from the service provider;
incorporating the data into the table at the telematics service provider, thereby obtaining an updated table;
transmitting, via the wireless connection, the updated table from the telematics service provider to the telematics unit in the mobile vehicle; and
storing the table in the electronic memory operatively associated with the telematics unit.

11. The method as defined in claim 7 wherein the communications network provider is the Global System for Mobile Communications available in the European Union.

12. The method as defined in claim 7 wherein after the request is denied by a mobile network operator, the telematics unit places an emergency call with the service provider other than the telematics service provider, and wherein the method further comprises:
denying, via the mobile operator, the request for emergency services from the service provider other than the telematics service provider; and then
directing the telematics unit, via the processor, to retry an emergency call with the telematics service provider or the other service provider.

13. A system for providing emergency services to a mobile vehicle, comprising:
a communications network provider configured to broadcast a network country code corresponding to a broadcasting area;
a telematics unit operatively disposed in the mobile vehicle, the telematics unit configured to determine a country in which the mobile vehicle is then-currently located by monitoring the broadcast;
an electronic memory operatively connected to the telematics unit, the electronic memory configured to store a table including a first list of country codes, the first list being associated with a telematics service provider; and
a processor operatively connected to the telematics unit, the processor including:
computer readable code for comparing the broadcasted network country code with the first list of country codes; and
computer readable code for directing the telematics unit to contact a particular entity based upon the comparing.

14. The system as defined in claim 13 wherein the processor further includes computer readable code for notifying the telematics service provider of a need for emergency service when the network country code is found in the first list.

15. The system as defined in claim 13 wherein the processor further includes:
computer readable code for comparing the network country code with a second list of country codes when the network country code is not found in the first list, the second list of country codes being associated with a service provider other than the telematics service provider; and computer readable code for directing the telematics unit to place an emergency call with the service provider other than the telematics service provider when the network country code is found in the second list.

16. The system as defined in claim 15 wherein the service provider other than the telematics service provider is an eCall service provider, and wherein the second list of country codes includes country codes of countries covered by the eCall service provider.

17. A system for providing emergency services to a mobile vehicle, comprising:
- a communications network provider configured to broadcast a network country code corresponding to a broadcasting area;
- a telematics unit operatively disposed in the mobile vehicle, the telematics unit configured to determine a country in which the mobile vehicle is then-currently located by monitoring the broadcast; and
- a processor operatively connected to the telematics unit, the processor including one of:
  - i) computer readable code for comparing the network country code with a list of country codes, the list being associated with a service provider other than a telematics service provider; and
    computer readable code for directing the telematics unit to automatically place an emergency call with the service provider other than the telematics service provider when the network country code is found in the list; or
  - ii) computer readable code for directing the telematics unit to place an emergency call with the service provider other than the telematics service provider, the emergency call including a request for emergency services.

18. The system as defined in claim 17, further comprising an electronic memory operatively connected to the telematics unit, the electronic memory configured to store a table including the list of country codes.

19. The system as defined in claim 17 wherein the service provider other than the telematics service provider is an eCall service provider, and wherein the list of country codes includes country codes of countries covered by the eCall service provider.

* * * * *